Nov. 6, 1923.
D. H. WOMACK
ANIMAL DIP AND INSECT TRAP
Filed Nov. 10, 1921
1,473,532
2 Sheets-Sheet 2
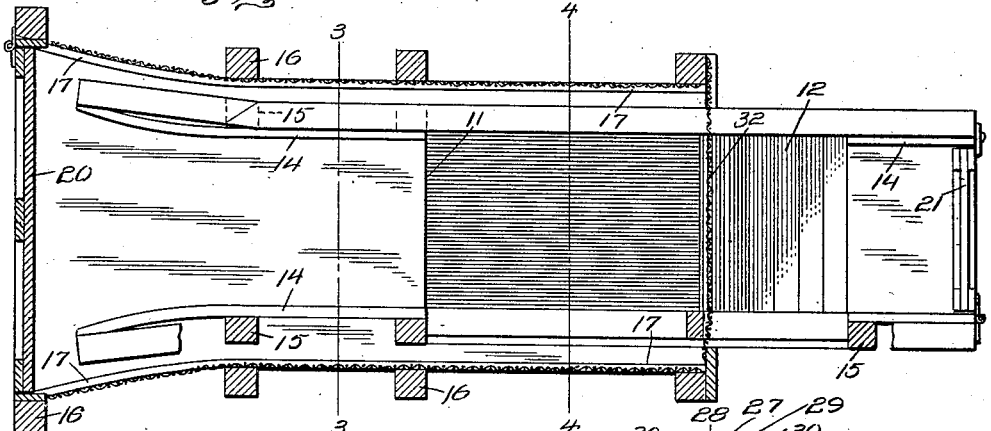
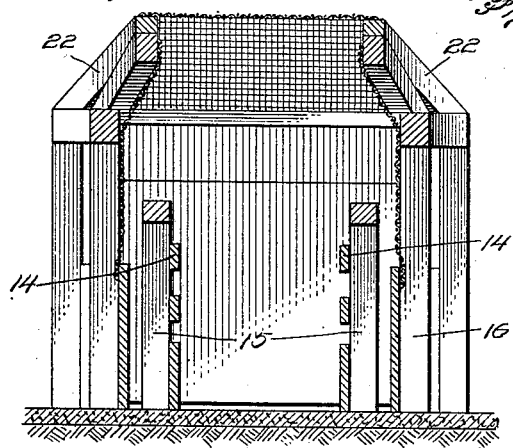
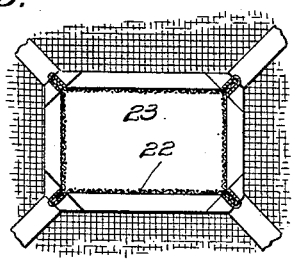
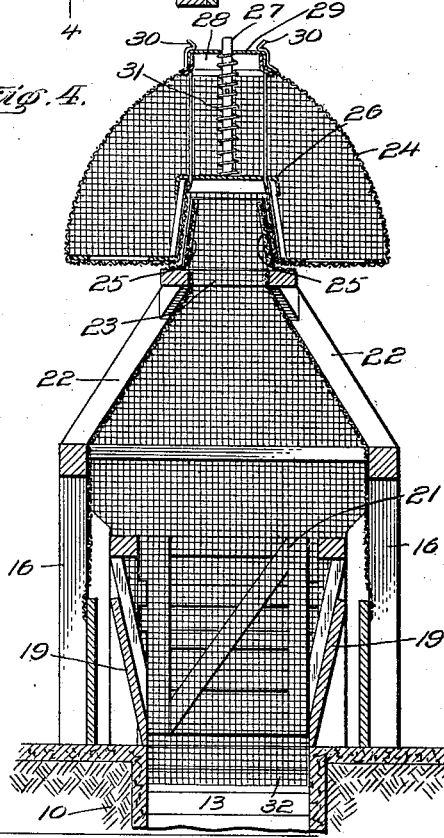
D. H. Womack, INVENTOR.
BY Geo. P. Kimmel, ATTORNEY.

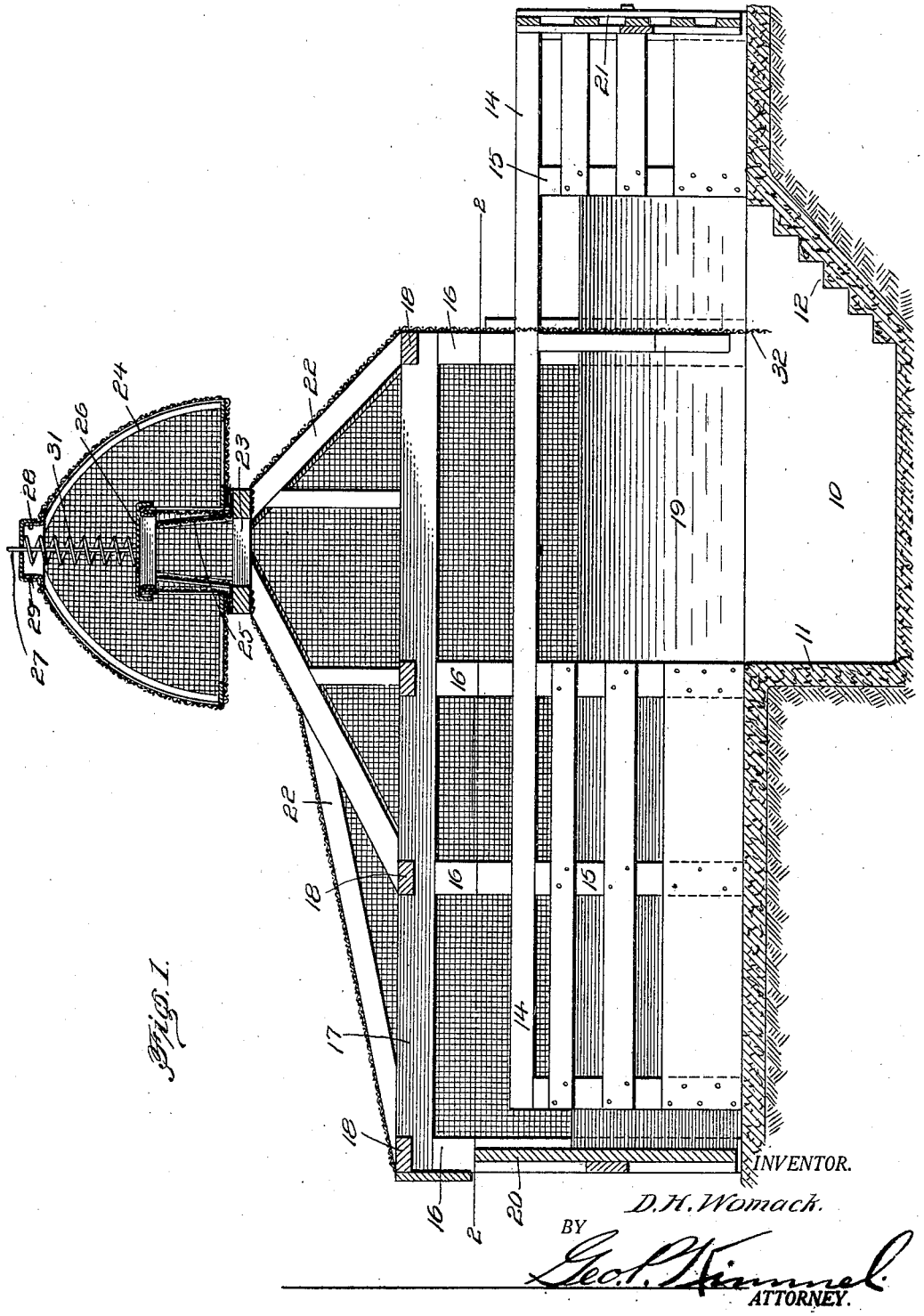

Patented Nov. 6, 1923.

1,473,532

UNITED STATES PATENT OFFICE.

DANIEL H. WOMACK, OF MONTGOMERY, TEXAS.

ANIMAL DIP AND INSECT TRAP.

Application filed November 10, 1921. Serial No. 514,272.

*To all whom it may concern:*

Be it known that I, DANIEL H. WOMACK, a citizen of the United States, residing at Montgomery, in the county of Montgomery and State of Texas, have invented certain new and useful Improvements in Animal Dips and Insect Traps, of which the following is a specification.

This invention relates to combined animal dipping and fly and other insect trapping devices, and has for one of its objects to provide an apparatus wherein the animals are effectually "dipped" and the flies and other insects not destroyed by the dipping are trapped as they rise from the animals' bodies during the dipping and subsequent draining operation.

Another object of the invention is to provide a device of this character having means whereby the flies and other insects which escape from the animals are caused to pass to a removable receiver or trap device in which they are destroyed.

With these and other objects in view, the invention consists in certain novel features of construction as hereinafter shown and described and then specifically pointed out in the claims, and in the drawings illustrative of the preferred embodiment of the invention:—

Figure 1 is a longitudinal sectional elevation of the improved apparatus.

Fig. 2 is a plan view of the parts shown in Fig. 1, in section on the line 2—2 of Fig. 1.

Fig. 3 is a transverse section on the line 3—3 of Fig. 2.

Fig. 4 is a transverse section on the line 4—4 of Fig. 2.

Fig. 5 is a sectional detail of a part of the lower portion of the insect trap.

The improved apparatus will be erected in coactive relation with an animal dipping tank, represented conventionally at 10, and preferably with an abrupt intake 11 and inclined outlet end 12, the latter having a plurality of steps to enable the animals to easily leave the tank after the dipping operation.

Runways leading to and from the tank are outlined by inner fence like sides, comprising longitudinal members or rails 14, and vertical members or posts 15.

The improved apparatus likewise includes a cage erected over the intake portion of the runway and over a portion of the tank and is formed with its sides, top and one end of fly screen material.

The cage comprises vertical post members 16 longitudinal rail members 17 and transverse stays 18, the cage supports being spaced from the inner fence structure, as represented in Figs. 2, 3 and 4, so that the animals in passing through the runways do not come in contact with the cage support or the screen material.

Inclined guard members 19 are located opposite the tank, to prevent the animals leaving the tank except by the exit runway, and swinging doors 20 and 21 temporarily close the inlet and outlets of the runway, as shown.

The cage structure above the upper longitudinal rails 17, is elevated as shown at 22, and constantly rises toward a contracted opening indicated at 23, the insects in their efforts to escape naturally crawling or flying toward the highest point of the cage, and to facilitate this movement, it will be noted, that all portions of the upper part of the cage converge to the relatively small opening 23.

Engaging over the larger or receiving cage is a smaller or trapping cage represented as a whole at 24, with walls and bottom of fly screen material, and with an internal upwardly projecting guide portion 25 forming a continuation of the outlet 23 of the larger cage, as shown in Figs. 1 and 4.

Arranged to engage over the inner upper end of the guide portion 25 is a closure 26 having a stem 27 extending upwardly therefrom.

The sides of the trap cage 24 are curved upwardly and inwardly and with an opening at the apex surrounded by an upstanding flange 28 over which the closure 29 is disposed and held in place by suitable catches indicated at 30.

The stem 25 has a spring 31 operating to hold the closure yieldably in closed position and the stem 27 has a hole through which a stop pin may be inserted to hold the stem, together with the closure 26, in elevated position against the pull of the spring 31, to permit the insects to freely pass into the trap cage.

It will be noted that one wall 32 of the screen material depends into the upper portion of the tank, so that the backs and heads of the animals pass close to the screen material when leaving the tank and thus obviate the chance of any of the insects being carried out by the animals.

When the animals pass into the intake runway and thence into the tank, the flies and other insects are driven from the animals by the liquid of the tank and naturally pass, as before stated, into the trap tank 24, the closure 26 having of course been elevated and held elevated as before stated, by the pin through the stem 27.

When the dipping action is completed, or when the trap cage is as full of insects as it is designed to contain, the stop pin is removed from the stem 27 to release the closure 26 and cause it to be closed by the reaction of the spring 31, and cut off any return movement of the insects.

The trap cage is then removed and immersed in a tank of water or other liquid and the insects therein thus destroyed. The destroyed insects are then removed from the trap cage and the latter returned to its position on the larger cage and thus "set" for the next dipping operation.

The exit runway provides a drainage space for the animals after leaving the tank, the liquid or solution flowing back into the tank. After the completion of the drainage operation, the animals are removed by opening the door 21.

The improved device is simple in construction, can be manufactured of inexpensive material and of any required size and capacity to adapt it to the tank over which it is disposed.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention, what is claimed as new is:—

1. An apparatus of the class described comprising a cage device adapted to be disposed over an animal dipping tank, said cage having screen material side walls and top, with the top converging to a contracted opening, a trap device engaging over the opening, and including an internal tubular portion detachably engaging over said contracted discharge.

2. An apparatus of the class described comprising a cage device adapted to be disposed over an animal dipping tank, said cage having screen material side walls and top with the top converging to a contracted opening, a guideway extending from the opening and constituting a continuation of the same, a trap device including an internal tubular portion detachably engaging over the extension of said opening, and a movable closure for said tubular portion operative from the exterior of the trap device.

In testimony whereof, I affix my signature hereto.

DANIEL H. WOMACK.